John Gibson Jr, Albany, N.Y.
"Table-Stand" for Ice-Pitchers, Coffee-Pots, &c.

No. 117066

PATENTED JUL 18 1871

John Gibson Jr
Inventor.

Witnesses.
Jno. H. Gibson
A. L. Van Zandt.

UNITED STATES PATENT OFFICE.

JOHN GIBSON, JR., OF ALBANY, NEW YORK.

IMPROVEMENT IN TABLE-STANDS FOR PITCHERS, &c.

Specification forming part of Letters Patent No. 117,066, dated July 18, 1871; antedated July 17, 1871.

*To all whom it may concern:*

Be it known that I, JOHN GIBSON, Jr., of the city and county of Albany, State of New York, have invented a new and useful article which I denominate a Table-Stand for Ice-Pitchers, Coffee-Pots, or other table-furniture; and I do hereby declare that the following is a specification thereof, reference being had to the accompanying drawing forming a part of this specification, in which—

Figure 1:
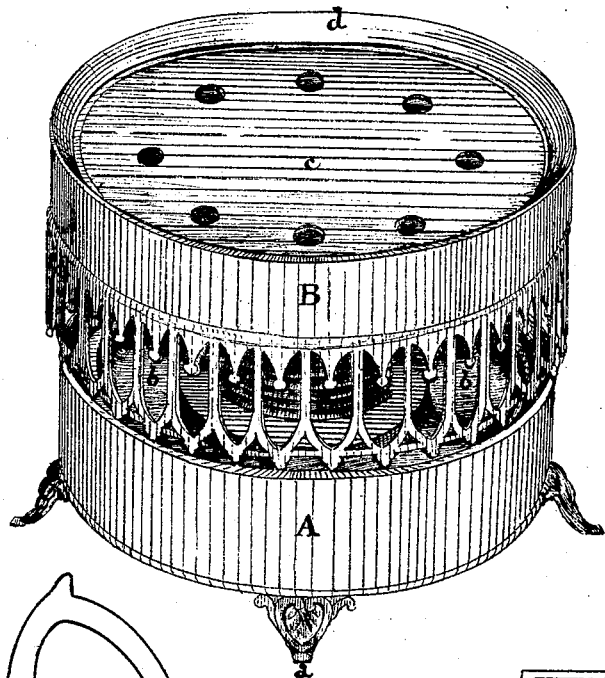
Figure 2:
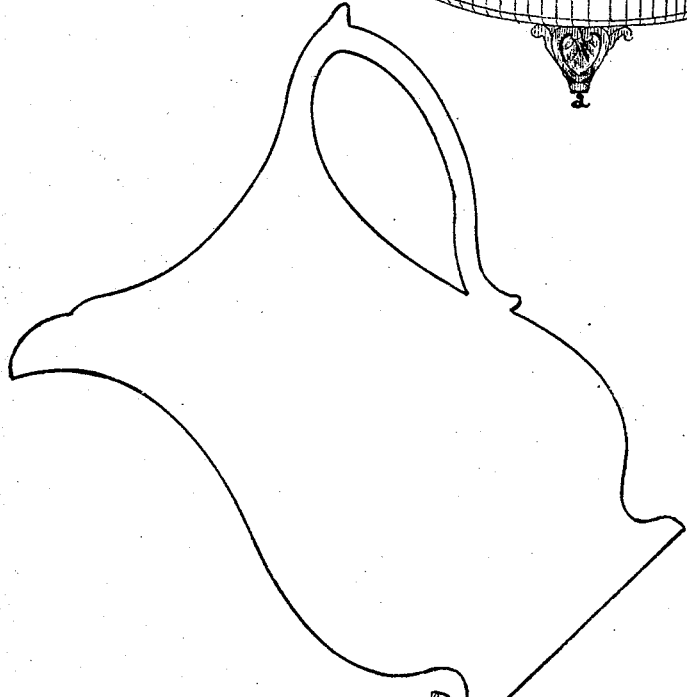
Figure 2:
Figure 2:
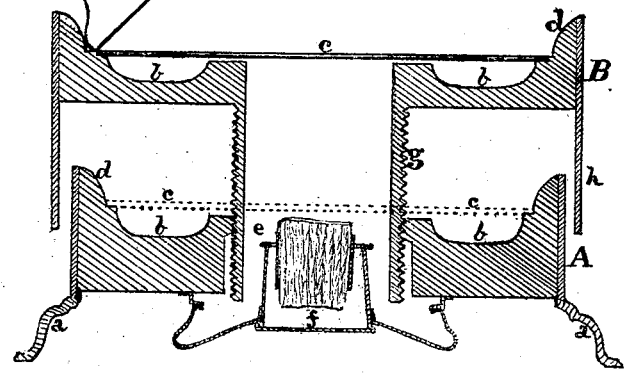

Figure 1 represents a perspective view of the invention. Fig. 2 is a cross-section of the invention, and illustrating one of its principal features for tilting pitchers and similar vessels.

The nature of my invention consists in a stand, made of metal or other suitable material, mounted on feet or other support, and provided on its top or face side with a receptacle for the drip from any vessel that may be used thereon, which receptacle is covered by a perforated or corrugated plate, on which the vessel is to rest. Projecting above the said plate, or the line thereof, at or near the edge of the stand, is made a flange or rim projecting upward, which flange or rim may embrace the whole or a part of the circumference of the stand, and which rim catches or impinges on the base of the pitcher or vessel while being tilted. I also provide, at or near the center of the stand, a vertical opening of considerable area, which will be capable of receiving a suitable lamp or gas-burner for heating a vessel. Another part of my invention consists in the combination, with the stand before described, of a second or supplementary stand, of similar general construction and arrangement on its upper side, which supplementary stand is made capable of being adjusted in its height by a screw or otherwise.

To enable others skilled in the art to make and use my invention, I will proceed to describe it in reference to the drawing and the letters of reference marked thereon, the same letters indicating like parts.

A represents the body of the stand, which may be made of metal or other suitable material, which stand is supported by the feet $a$, or any suitable plain or ornamental rim. In the top side of the body of the stand A I make a receptacle, $b$, of any suitable size or form adapted to receive the drip or condensation of moisture from the vessels that may be placed thereon. Placed over the said receptacle $b$ is a plate, C, shown by dotted lines in Fig. 2, for supporting any vessel that may be placed thereon. Said plate is perforated, or may be corrugated or otherwise constructed, so as to allow the drip or condensation of moisture from the vessel to pass into the receptacle $b$. Projecting above the plate $c$, or the line thereof, and at or near the outer edge of the body of the stand A, is a flange or rim, $d$, which may be continuous or otherwise, and of any suitable form or height, to prevent a vessel from slipping off the stand, and to aid in tilting a pitcher or similar vessel. For heating purposes I provide, at or near the center of the body of the stand A, a vertical opening, $e$, in which I place any suitable lamp, $f$, or equivalent gas-burner, (not shown,) which lamp or gas-burner does not fill the entire opening in the body of the stand A, but is arranged to allow the needed supply of air to the lamp or burner, which may be attached in any suitable manner to the under side of the stand A. Above the stand A is a second or supplementary stand, B, in which the general construction of the upper or top side is the same as the lower stand A. The said stand B is supported from the stand A by a sleeve or stem, $g$, furnished on its outer side with a screw-thread, which works in a screw-thread made in the body of the stand A, as shown in Fig. 2, by which means the stand B may be elevated or lowered, as may be desired; or the said elevating or lowering of the stand B may be effected by a tube or stem working vertically in the opening $e$ of the body of the stand A, and held in place by a set-screw; or a vertical rack and pinion may be used to secure the same result. If the heating arrangements are dispensed with, a solid stem or support may be used in place of the tube $g$.

By this invention pitchers and other vessels may be supported on a table at heights convenient for pouring into cups or glasses of various heights, and in tilting said vessels the operator is aided both by the support of the stand A and the impingement of the flange $d$ against the base of the vessel while being tilted, as illustrated by outline of vessel in Fig. 2. When the stem or tube $g$ is made no longer than the depending outer rim $h$ of the stand B, then the stand B may be used separately as an independent stand, if desired, as it will then rest upon said outer depending rim $h$. The size, height, and configuration of the stands A or B; also the relative proportions of the parts or appendages thereof, as described, may be varied according to taste or circumstance; also any or all of the parts or features of this invention, as described, may be used together or separately—that is to say, if the stand A is constructed only for ice-pitchers, &c., (not to be heated,) then no lamp is required; or, again, if the stand A is constructed to be used only with coffee-pots and the like, then the receptacle $g$ may be dispensed with and the lamp $f$ may be used.

Having described my invention, what I claim, and desire to secure by Letters Patent, is—

1. In combination with the stand A, either with or without the receptable $b$, the flange or rim $d$, substantially as described, for the purpose set forth.

2. The combination of the supplementary stand B with the stand A, when arranged to be adjustable in height, substantially as and for the purpose specified.

3. In combination with the stand A or B, constructed with the receptacle $b$, the detachable or portable plate C, when arranged to operate substantially in the manner and for the purpose set forth.

4. In combination with the stand A or B, provided with the flange $d$, the vertical central opening $e$, substantially as and for the purpose set forth.

JOHN GIBSON, JR.

Witnesses:
JNO. H. GIBSON,
A. L. VAN ZANDT.